(12) United States Patent
Davis et al.

(10) Patent No.: US 8,556,589 B2
(45) Date of Patent: Oct. 15, 2013

(54) HYBRID COMPOSITE FOR EROSION RESISTANT HELICOPTER BLADES

(75) Inventors: Janet B Davis, Thousand Oaks, CA (US); David B Marshall, Thousand Oaks, CA (US); Olivier H Sudre, Thousand Oaks, CA (US); Sergio dos Santos e Lucato, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 920 days.

(21) Appl. No.: 12/650,172

(22) Filed: Dec. 30, 2009

(65) Prior Publication Data
US 2010/0329880 A1   Dec. 30, 2010

Related U.S. Application Data

(60) Provisional application No. 61/220,033, filed on Jun. 24, 2009.

(51) Int. Cl.
*B64C 11/00* (2006.01)

(52) U.S. Cl.
USPC .................... 416/224; 416/230; 416/241 B

(58) Field of Classification Search
USPC .............. 416/224, 229 R, 230, 241 A, 241 B, 416/241 R
See application file for complete search history.

(56) References Cited

U.S. PATENT DOCUMENTS

| | | | | |
|---|---|---|---|---|
| 5,542,820 A * | 8/1996 | Eaton et al. | ................... | 416/224 |
| 5,782,607 A * | 7/1998 | Smith et al. | ................... | 416/224 |
| 6,132,857 A * | 10/2000 | Champenois et al. | ..... | 428/300.7 |
| 6,341,747 B1 * | 1/2002 | Schmidt et al. | ............ | 244/123.1 |
| 6,447,254 B1 * | 9/2002 | Holowczak et al. | .......... | 416/224 |
| 7,198,860 B2 * | 4/2007 | Vance | ........................... | 428/701 |
| 7,871,716 B2 * | 1/2011 | Vance | ........................... | 428/701 |
| 8,216,658 B2 * | 7/2012 | Rajabali et al. | ................. | 428/77 |
| 2005/0169763 A1 * | 8/2005 | Anning | ........................... | 416/224 |
| 2010/0329880 A1 * | 12/2010 | Davis et al. | ............... | 416/229 R |

OTHER PUBLICATIONS

William D. Weigel, "Advanced Rotor Blade Erosion Protection System," USAATCOM TR 95-D-8, Final Report (1996).
UDRI Particle Erosion Test Apparatus Use Polices, Operating Procedures and Specimen Configurations Manual (2006).
Craig A. Folsom, Frank W. Zok and Fred F. Lange, "Mechanical Behavior of a Laminar Ceramic/Fiber-Reinforced Epoxy Composite," J. Am. Ceram. Soc. 75 [11] 2969-75 (1992).
Bruno A. Latella and Brian H. O'Connor, "Effect of Porosity on the Erosive Wear of Liquid-Phase-Sintered Alumina Ceramics," J. Am. Ceram. Soc., 82 [8] 2145-49 (1999).

* cited by examiner

*Primary Examiner* — Edward Look
*Assistant Examiner* — Christopher R Legendre
(74) *Attorney, Agent, or Firm* — Glenn H. Lenzen; Husch Blackwell LLP

(57) ABSTRACT

A protective hybrid composite for a rotor blade is based on the use of tape cast ceramic layers densified by pre-ceramic polymer infiltration methods and laminated together with polymer matrix composite prepregs, with or without an embedded metallic mesh, to form a conforming helicopter blade cladding that is laminated to the blade surface for added erosion protection. The hybrid composite is fabricated to net shape and laminated to the blade using either an adhesive or a polymer composite prepreg inner layer. Installation is accomplished by a standard composite fabrication method of vacuum bagging the blade while the system is laminated to its surface. Repair methods based on removal of ceramic tiles is facilitated by incorporation of a metallic mesh element laminated beneath the ceramic tiles that can be used to heat the tile and decrease its adhesion strength.

17 Claims, 4 Drawing Sheets

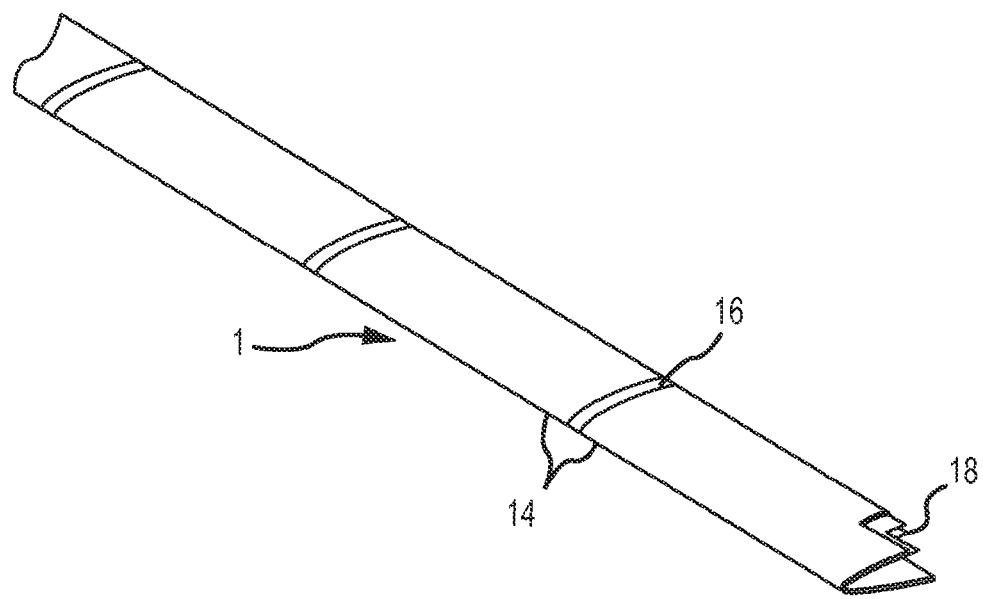
FIG.1
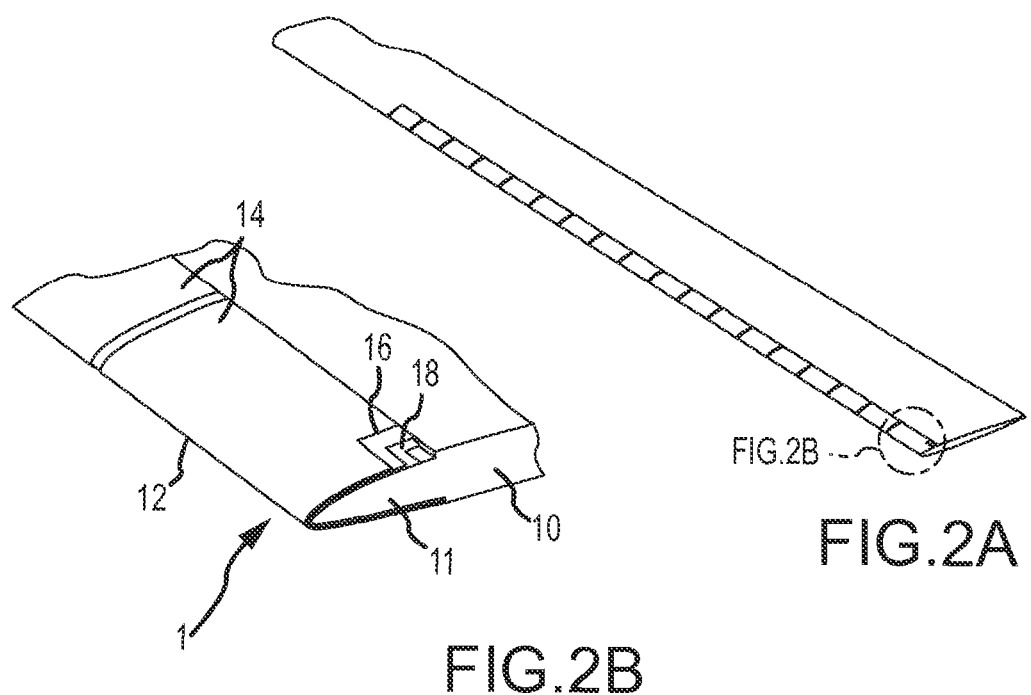
FIG.2A
FIG.2B

HYBRID COMPOSITE FOR EROSION RESISTANT HELICOPTER BLADES

PRIORITY

This application claims priority under 35 U.S.C. §119(e) to U.S. Patent Application No. 61/220,033, which is incorporated by reference herein.

FIELD OF THE INVENTION

The present invention relates to a hybrid composite segment. Specifically, the present invention is for a hybrid composite segment for erosion resistant helicopter rotor blades.

BACKGROUND OF THE INVENTION

Impact from sand and other debris can be detrimental to the lifetime of rotating components such as helicopter blades. In a desert environment, blade leading edges are exposed to both rain and sand erosion.

One attempt at protecting blade leading edges is to use a leading edge metallic erosion strip consisting of nickel (Ni) on an outboard portion and titanium (Ti) on the inboard portion of the blade. The metallic strips are further protected by polymeric tapes or coating even though these are generally less effective in rain erosion conditions.

Other attempts at increasing the life of rotor blades can be found in U.S. patent application publication no. 2005/0169763, for example, which uses a strip of resilient polymer adhered to the leading edge of the blade. Others have simply placed a ceramic component onto the leading edge of the rotor blade, as disclosed in U.S. Pat. Nos. 6,447,254, 5,782,607, and 5,542,820. Still others have capped the leading edge with a nanoparticle-reinforced elastomer, as disclosed in U.S. Pat. No. 6,341,747. However, the above prior art attempts do not increase the time between maintenance of the rotor blades and decrease costs.

In view of the above, it will be apparent to those skilled in the art from this disclosure that there exists a need for an improved erosion resistant helicopter rotor blade. This invention addresses this need in the art as well as other needs, which will become apparent to those skilled in the art from this disclosure.

BRIEF DESCRIPTION OF THE DRAWINGS

Referring now to the attached drawings that form a part of this original disclosure:

FIG. 1 illustrates a plurality of hybrid segments in accordance with an embodiment of the present invention;

FIG. 2A illustrates the plurality of hybrid segments disposed on a leading edge of a helicopter rotor blade in accordance with the embodiment of the present invention;

FIG. 2B is a magnified view and partial cut-away of selected hybrid segments in FIG. 2A;

DETAILED DESCRIPTION OF THE PREFERRED EMBODIMENTS

Figure 3A:
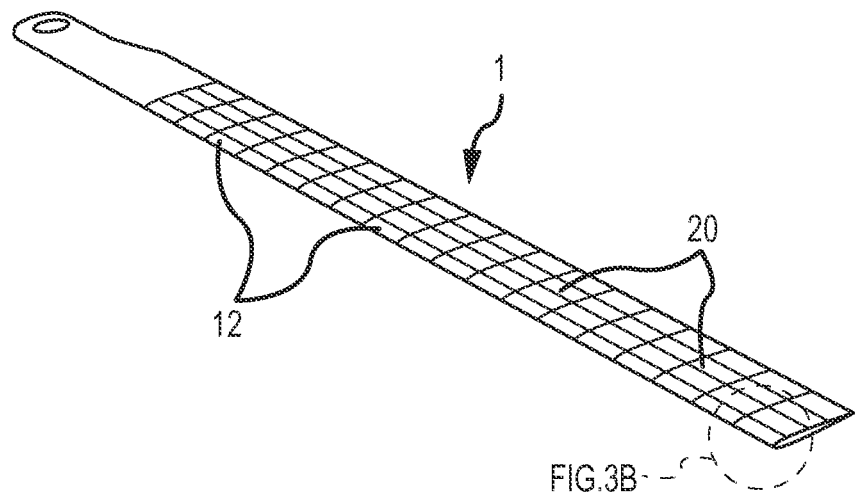
FIG. 3A illustrates another embodiment of the present invention wherein the hybrid segments are disposed on a leading edge and include tiles that extend across an upper and lower surface of the blade.

Referring to FIGS. 1-2, a first embodiment of a hybrid composite 1 is shown generally at 1. The hybrid composite 1 includes a plurality of hybrid segments 12 disposed on a leading edge 11 of a rotor blade 10. The hybrid composite 1 protects areas of the blade 10 most prone to erosion damage. The hybrid segments 12 are disposed side by side on the blade 10 on a portion of the blade and are spaced apart at a predetermined distance. Thus, protection is provided at a lower cost because the hybrid segments 12 can be placed only in areas that experience high erosion. Each of the hybrid segments 12 includes multiple thin layers of erosion-resistant ceramic material, alternating with layers of tough fiber-reinforced polymer matrix composite 16.

The hybrid composite 1 comprises multiple thin layers of segmented, erosion-resistant ceramic material, alternating with continuous layers of fiber reinforced polymer matrix composite 16. The number of layers is preferably 2 to 10 layers, for example, that provides an overall thickness of the composite 1 in the range of 1 to 3 mm, for example. The hybrid composite 1 is tolerant to damage, while presenting a ceramic surface with high hardness and erosion resistance. When disposed on the blade 10, the hybrid composite 1 takes the form of a net shaped cladding. Thus, the present invention advantageously provides a hybrid composite 1 formed as a net shaped cladding that is laminated directly to the surface of the blade 10 using the polymer matrix composite 16 or another adhesive. In addition, the curved ceramic segments, which are formed to net shape, are laminated with polymer composite prepreg layers. The ability to produce the ceramic elements to net shape using thin flexible tape-cast layers that can be molded in their green state is beneficial.

The erosion-resistant ceramic material comprises a hard ceramic containing, for example, $Al_2O_3$, $SiC$, $Si_3N_4$ and $B_4C$. In the embodiment shown in FIGS. 1-2, the exterior ceramic material constitutes an exterior shell 14, and the interior ceramic material constitutes an interior shell 18. A layer of the polymer matrix composite 16 is disposed between the exterior shell 14 and the interior shell 18 as well as between the interior shell 18 and the leading edge 11.

The exterior shell 14 protects against erosion from sand and rain. Furthermore, the multilayer structure of the hybrid composite 1 protects against unusually excessive erosion that may eventually penetrate the exterior shell 14. The polymer matrix composite 16 includes optimal reinforcement architectures to reduce crack opening displacements of the ceramic shells 14, 18 or tiles 20 in the event of fracture and to bond strongly to the ceramic material to prevent the loss of broken fragments.

The hybrid segments 12 are bent around the leading edge 11 so as to generally take the form of the leading edge 11. That is, the hybrid segments 12 can be C-shaped or U-shaped. Specifically, the hybrid segments 12 are formed such that an exterior surface follows the outer-mold line profile of the blade 10 including the leading edge or blade tip 11 curvatures.

In other words, the exterior shell 14 is disposed on a layer of the polymer matrix 16 positioned on the interior shell 18 such that the exterior shell 14 continues or matches an exterior contour of the blade 10. The interior shell 18 is directly adhered to the leading edge 11 of the blade 10 using the polymer matrix composite 16 or an adhesive.

In use, a plurality of the hybrid segments 12 is disposed on the blade 10. Preferably, the segments 12 are spaced apart at a predetermined distance. The predetermined distance can affect the stiffness and is determined to allow deflection matching to the underlying blade 10. In addition, the lateral dimensions of the hybrid segments 12 can affect stiffness and are determined or adjusted accordingly.

Various hybrid segments 12 can be replaced as they become worn without having to replace all of the segments 12. That is, if a portion of the blade 10 experiences more wear than other portions, the corresponding hybrid segments 12 with higher wear can be replaced. In addition, the composition of the hybrid segments 12 can be varied to tailor stronger segments for those portions of the blade 10 that consistently have more wear than other portions.

Unlike prior art components that are formed as a single piece along the length of the leading edge, the hybrid segments 12 are not monolithic. Specifically, the hybrid segments 12 are made as replaceable pieces that are disposed on the leading edge 11 and are individually removable as wear occurs. This advantageously allows failure in a non-catastrophic manner. That is, the hybrid segments 12, in their segmented geometry, can be replaced without replacing an entire, one-piece component that covers the entire length of the leading edge.

Indeed, the use of the hybrid segments 12 advantageously allows field repair by replacement of individual hybrid segments 12 or individual exterior shells 14. As explained in detail below, the hybrid composite 1 can include a metallic mesh 22 to aid in removal of the hybrid segments 12 or merely the exterior shell 14.

The hybrid composite 1 is assembled as a single blade cover or cladding with at least one continuous polymer matrix composite 16 layer holding the hybrid segments 12 in place. The design and manufacture of the hybrid composite 1 facilitates assembly while not precluding subsequent replacement of individual damaged hybrid segments 12. The ceramic tiles 20 and polymer composite matrix 16 layers are assembled and formed onto the blade 10 by vacuum molding in a tool that defines the outer mold line shape. Once assembled, the laminate stacks are vacuum bagged and warm pressed to form a final configuration.

Figure 3B:
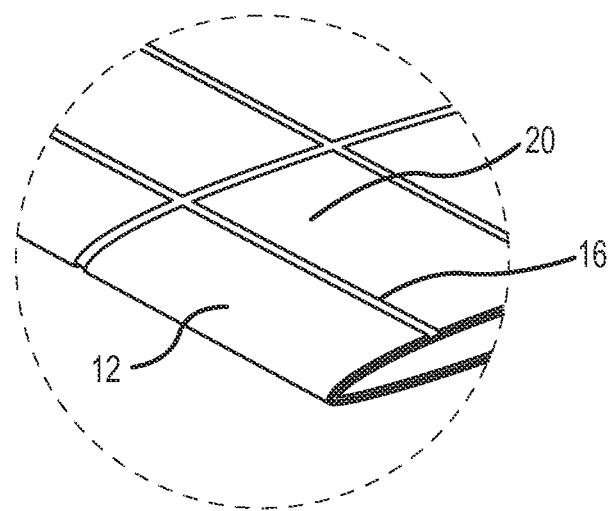
FIG. 3B is a magnified view and partial cut-away of selected hybrid segments in FIG. 3A.

In the embodiment of the hybrid composite 1 shown in FIG. 3, each of the hybrid segments 12 further include a plurality of tiles 20. Specifically, the hybrid segments 12 are extended across the blade 10 using multiple thin layers of erosion-resistant ceramic material, in the form of tile 20, alternating with layers of fiber-reinforced polymer matrix composite 16. The tiles 20 are placed sequentially and are substantially aligned with one another as the plurality of tiles 20 extend across the top and bottom surfaces of the blade 10. The erosion-resistant ceramic material of the tile 20 comprises a ceramic containing, for example, $Al_2O_3$, $SiC$, $Si_3N_4$ and $B_4C$. In the embodiment of FIG. 3, the exterior ceramic material bent around the leading edge 11 and in the form of exterior tiles 20 constitutes the exterior shell 14, and the interior ceramic material bent around the leading edge 11 and in the form of interior tiles 20 constitutes the interior shell 18. The number of layers is preferably 2 to 10 layers, for example, that provides an overall thickness of the composite 1 in the range of 1 to 3 mm, for example.

Figure 4A:
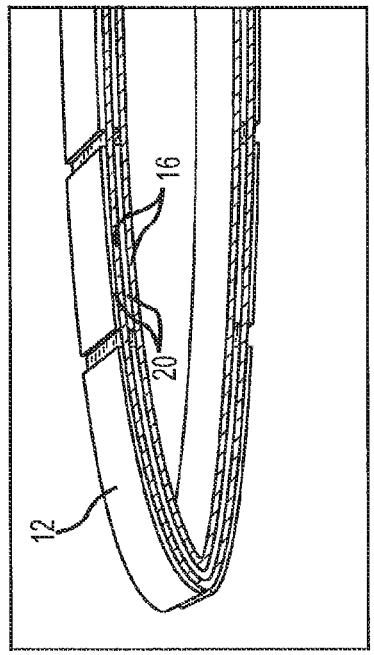
FIG. 4A is a partial cut-away and schematic of the embodiment shown in FIGS. 3A and 3B.
Figure 4B:
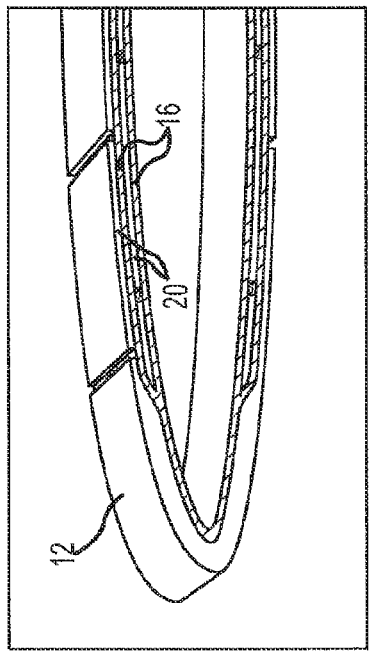
FIG. 4B is a partial cut-away and schematic of another embodiment of the present invention wherein a gap is present at a tip of the blade.
Figure 4C:
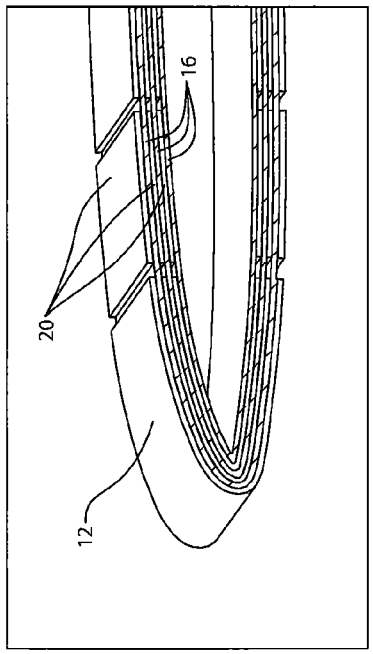
FIG. 4C is a partial cut-away and schematic of another embodiment of the present invention wherein tiles are staggered in position from one layer to the next layer.
Figure 4D:
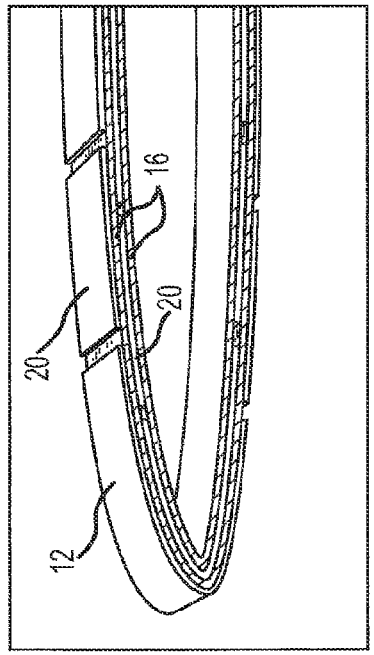
FIG. 4D is a partial cut-away and schematic of another embodiment of the present invention wherein tiles of varying thicknesses are in a staggered array.

FIGS. 4A-D are schematics illustrating examples of hybrid composites 1 with various laminate stacks. FIG. 4A is the stack used in the embodiment of FIG. 3 and has uniform thickness ceramic tiles 20 that overlie one another in alignment. The embodiment in FIG. 4B also has ceramic tiles 20 that overlie one another in alignment but also have hybrid segments 12 that are in two sections. In other words, a gap is present at the tip of the blade 10 and a layer of the polymer matrix composite is disposed therein. The embodiment of FIG. 4C includes ceramic tiles 20 having a uniform thickness that are staggered in position from one layer to the next. FIG. 4D also illustrates tiles 20 that are staggered from one layer to the next. However, the tiles 20 are of varying thickness and a thick, single-layer hybrid segment 12 is disposed at the blade tip 11.

A method of making the hybrid composite 1 is provided herein. Basically, the hybrid segments 12 and tiles 20 are made by tape casting a slurry of ceramic materials in thin sheets and densifying to net shape without applied pressure. Thus, the hybrid segments 12 can be formed as curved ceramic segments. The thin sheets preferably take the form of a tile and are laminated with polymer composite prepreg layers. The inventive method of making the hybrid segments 12 advantageously produces ceramic elements to net shape using thin flexible tape-cast layers that can be molded in their green state. As cast, the green thin sheets (tapes) contain an organic binder that renders them flexible. In this state, the green thin sheets can be placed within ceramic tooling and shaped. Upon heat-treatment, the binder burns out and the sheets partially sinter and become rigid. In this way, the hybrid segments 12 are formed such that its exterior surface follows the outer-mold line profile of the blade 11 including the blade tip curvatures. The binder phase in the tape facilitates lamination of green tapes at room temperature. Therefore, thin green tapes can be stacked together to increase the thickness of the ceramic tiles or to produce tiles with a tapered thickness. The tile thickness can also be tapered by ply drop-off during lamination rather than by costly machining. Thicker surface tiles can be used in highly impacted areas and thinner tiles in areas that experience less severe erosion in service. Furthermore, the ability to use tape lamination to build complex shaped ceramic tiles will allow consideration of a large number of protective cover designs without the restriction of a processing cost penalty.

The use of pressureless sintering to full or nearly full density advantageously provides a large decrease in cost relative to hot-pressed materials. Previously, high density was achieved by using expensive hot pressing. The method of making the hybrid composite 1 further includes the addition of a pre-ceramic polymer infiltrations rather than pressure to aid densification. After pressureless sintering, the relative density of the ceramic hybrid segments will be at least 65%, for example. The density is increased by infiltration of the connected porosity with a pre-ceramic polymer or precursor slurry that can be converted to ceramic through an additional heat-treatment. High-yield slurries and precursors are used routinely by those skilled in the art to densify alumina and silicon carbide fiber reinforced composites. These composites are infiltrated and heated to a temperature suitable for ceramic conversion of the precursor but below the densification temperature of the polymer composite matrix several times prior to heating (without pressure) to the final sintering temperature. Ultimately, the final density will depend on the number of infiltration cycles used. In this way, polymer composite matrix densities greater than approximately 90%, for example can be achieved.

The use of segmented ceramic layers in the hybrid composite 1, which simplifies production of conformal structures, allows field repair by replacement of individual tiles after damage, contributes to high damage tolerance of the composite under impact and bending loads, and contributes to the ability to strain-match the blade 10.

The present invention also advantageously provides the ability to select fiber volume fraction and lay-up within the continuous polymer matrix composite 16 layer, which allows the stiffness in various loading directions to be controlled. The present invention further provides the ability to attach hybrid laminates with a hard, dense ceramic strike face (the exterior surface of exterior shell 18) under ambient temperature conditions that will not damage the blade 10. That is, the hybrid composite 1 including the hybrid segments 12 with tiles 20 is field removable and replaceable.

The composite 1 can also be configured to account for thermal conductivity and dielectric requirements established to ensure that a deicing system installed in the blades 10 remains functional. Through selection of materials for the ceramic strike face and the fiber reinforcement, conductivity can be 12 W/mK or 0.20 cal/cm sec K, for example. Thus, the present invention provides the protection described above without hindering the deicing system of the blade 10.

Figure 5:
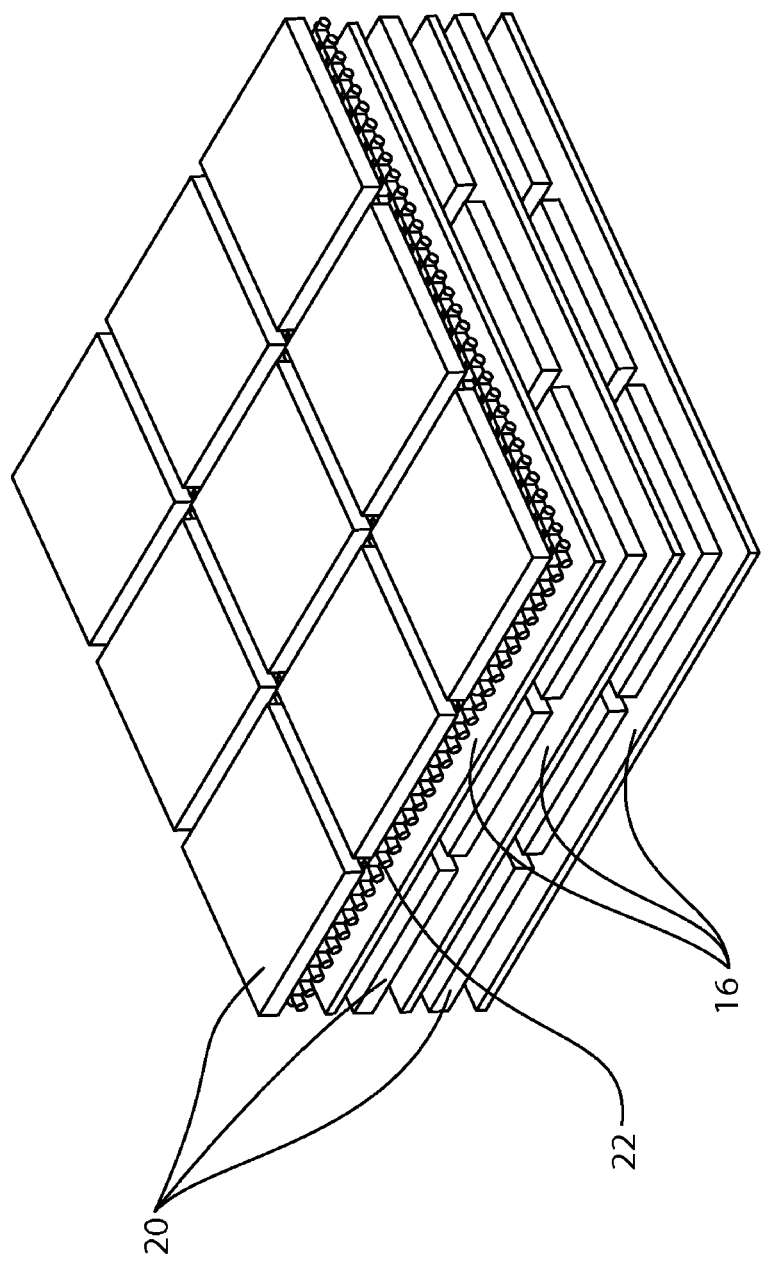
FIG. 5 is a partial cut-away and schematic of another embodiment of the present invention with an embedded metallic mesh.

Referring to FIG. 5, the hybrid composite 1 may include a conductive metallic mesh 22 comprised of wires embedded beneath a layer of ceramic material. The metallic mesh 22 is laminated directly beneath a ceramic layer of the hybrid segment 12. The metallic mesh 22 can be used in any of the embodiments described herein. In the embodiment shown in FIG. 5, the metallic mesh 22 is directly beneath the exterior shell 14. However, the metallic mesh 22 may be placed beneath each layer of ceramic material, as conditions require. The metallic mesh 22 is used to heat the polymer matrix composite 16 beneath a damaged segment 12 or individual tile 20. The tile 20, for example, is removed and a new tile 20 (and possibly a new prepreg layer) is laminated in its place.

To remove a tile 20, the mesh 22 beneath it is heated by passing a current through the wires of the mesh 22 or by using handheld RF or microwave generators (such as those used as medical devices) to reduce the adhesive strength of the polymer matrix composite 16 locally. The replacement tile 20 is placed into the gap left by the removed tile 20. A vacuum bag and heating pad is then placed locally over the new tile 20 to affix it to the erosion resistant cladding. Additionally, the embedded metallic mesh 22 could serve a dual role by providing lightening strike protection.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention. For example, the size, shape, location or orientation of the various components can be changed as needed and/or desired. Components that are shown directly connected or contacting each other can have intermediate structures disposed between them. The functions of one element can be performed by two, and vice versa. It is not necessary for all advantages to be present in a particular embodiment at the same time. Thus, the foregoing description of the embodiments according to the present invention is provided for illustration only, and not for the purpose of limiting the invention.

The invention claimed is:

1. A hybrid composite for a helicopter blade comprising:
   a plurality of hybrid segments spaced apart at a predetermined distance, each of the hybrid segments including
      an exterior shell composed of a ceramic material shaped to conform to a leading edge of the helicopter blade, and
      an interior shell composed of a ceramic material shaped to conform to the leading edge and to attach to the leading edge;
   a first polymer matrix composite layer disposed between the exterior shell and the interior shell in each of the hybrid segments; and
   a second polymer matrix composite layer disposed underneath the interior shells of the hybrid segments and between the spaced apart hybrid segments.

2. The hybrid composite of claim 1, wherein the first and second polymer matrix composite layers are fiber reinforced.

3. The hybrid composite of claim 1, wherein an exterior surface of the hybrid segments follow an outer-mold line profile of the blade including the leading edge curvature.

4. The hybrid composite of claim 1, further comprising a conductive metallic mesh disposed in the hybrid segments.

5. The hybrid composite of claim 1, wherein each of the ceramic shell layers is formed as a plurality of tiles spaced apart at a predetermined distance.

6. The hybrid composite of claim 5, wherein the plurality of tiles extend the exterior and interior shells across a surface of the blade.

7. The hybrid composite of claim 6, wherein the first polymer matrix composite layer is further disposed between the tiles of the exterior shell and the second polymer matrix composite layer is further disposed underneath the tiles of the interior shell and between the spaced apart tiles.

8. The hybrid composite of claim 5, wherein individual tiles are field removable and replaceable.

9. The hybrid composite of claim 1, wherein individual hybrid segments are field removable and replaceable.

10. The hybrid composite of claim 1, wherein individual exterior shells are field removable and replaceable.

11. A hybrid composite for a helicopter blade comprising:
    a plurality of hybrid segments spaced apart at a predetermined distance, each of the hybrid segments including a plurality of ceramic shell layers shaped to conform to a leading edge of the helicopter blade, one of the ceramic shell layers being further shaped to attach to the leading edge; and
    a plurality of polymer matrix composite layers disposed between the ceramic shell layers.

12. The hybrid composite of claim 11, wherein the polymer matrix composite layers include fiber reinforcement.

13. The hybrid composite of claim 11, wherein an exterior surface of the hybrid segments follow an outer-mold line profile of the blade including the leading edge curvature.

14. The hybrid composite of claim 11, further comprising a conductive metallic mesh disposed in the hybrid segments.

15. The hybrid composite of claim 11, wherein each of the ceramic shell layers is formed as a plurality of tiles spaced apart at a predetermined distance.

16. The hybrid composite of claim 15, wherein the plurality of tiles extend across a surface of the blade.

17. The hybrid composite of claim 11, wherein at least a portion of the hybrid segments are field removable and replaceable.

\* \* \* \* \*